（12） United States Patent
Garcia Azorero

(10) Patent No.: US 12,003,662 B2
(45) Date of Patent: Jun. 4, 2024

(54) METHODS, APPARATUS AND COMPUTER-READABLE MEDIUMS SUPPORTING SUBSCRIPTIONS TO EVENTS IN A CORE NETWORK

(71) Applicant: Telefonaktiebolaget LM Ericsson (publ), Stockholm (SE)

(72) Inventor: Fuencisla Garcia Azorero, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/268,266

(22) PCT Filed: Sep. 28, 2018

(86) PCT No.: PCT/EP2018/076457
§ 371 (c)(1),
(2) Date: Feb. 12, 2021

(87) PCT Pub. No.: WO2020/035157
PCT Pub. Date: Feb. 20, 2020

(65) Prior Publication Data
US 2021/0176366 A1 Jun. 10, 2021

(30) Foreign Application Priority Data
Aug. 13, 2018 (EP) .................. 18382610

(51) Int. Cl.
*H04M 15/00* (2006.01)
*H04W 4/60* (2018.01)
*H04W 8/20* (2009.01)
(52) U.S. Cl.
CPC ........... *H04M 15/66* (2013.01); *H04M 15/61* (2013.01); *H04M 15/8278* (2013.01); *H04W 4/60* (2018.02); *H04W 8/20* (2013.01)

(58) Field of Classification Search
CPC .. H04M 15/66; H04M 15/61; H04M 15/8278; H04W 4/60; H04W 8/20
(Continued)

(56) References Cited

U.S. PATENT DOCUMENTS

| 2012/0020345 A1 | 1/2012 | Zhou et al. |
| 2015/0071125 A1 | 3/2015 | Wang et al. |

(Continued)

FOREIGN PATENT DOCUMENTS

CN 101364952 A 2/2009

OTHER PUBLICATIONS

International Search Report and Written Opinion dated Nov. 30, 2018 in International Application No. PCT/EP2018/076457 (11 pages total).

(Continued)

*Primary Examiner* — Obaidul Huq
(74) *Attorney, Agent, or Firm* — Rothwell, Figg, Ernst & Manbeck, P.C.

(57) ABSTRACT

The disclosure provides various methods, apparatus and computer-readable mediums supporting subscriptions to events in a core network. One method in a network exposure function for a core network comprises: providing, to a policy control function for the core network, a subscription request message indicating a request for a subscription for a plurality of terminal devices to receive notifications of events from the policy control function. The subscription request message comprises one or more of: an indication of one or more identifiers of events for which the plurality of terminal devices are to receive notifications; an indication of a type of resources to which the subscription relates; an indication of one or more services defined in the policy control function to which the subscription relates; and an indication as to (Continued)

whether notifications of events are to comprise an indication of one or more rules affected by the event.

23 Claims, 5 Drawing Sheets

(58) Field of Classification Search
USPC .......................................... 370/310, 328, 329
See application file for complete search history.

(56) References Cited

U.S. PATENT DOCUMENTS

| | | | |
|---|---|---|---|
| 2017/0063946 | A1 | 3/2017 | Quan et al. |
| 2018/0192390 | A1 | 7/2018 | Li et al. |
| 2019/0109823 | A1* | 4/2019 | Qiao ..................... H04M 15/66 |
| 2019/0166016 | A1* | 5/2019 | Livanos ................ H04L 67/322 |
| 2019/0230175 | A1* | 7/2019 | Wang, IV .............. H04L 67/12 |
| 2019/0253917 | A1* | 8/2019 | Dao ................... H04W 28/0268 |

OTHER PUBLICATIONS

Nokia et al., "TS 23.502: Exposure—Bulk event subscription", 3GPP Draft, S2-176643, SA WG2 Meeting #122bis, Aug. 21-25, 2017, Sophia Antipolis, France, XP051335952, http://www.3gpp.org/ftp/tsg_sa/WG2_Arch/TSGS2_122BIS_Sophia_Antipolis/Docs/ (10 pages total).

NTT Docomo et al., "TS 23.501 Ol#7c: storing AF related PCC rules in SMF", 3GPP Draft, S2-178019, SA WG2 Meeting #123, Oct. 23-27, 2017, Ljubljana, Slovenia, XP051360636, http://www.3gpp.org/ftp/tsg_sa/WG2_Arch/TSGS2_123_Ljubljana/Docs/ (6 pages total).

3GPP TS 23.501 V15.0.0, Dec. 2017, 3rd Generation Partnership Project; Technical Specification Group Services and System Aspects; System Architecture for the 5G System; Stage 2 (Release 15) (181 pages total).

3GPP TS 23.502 V15.0.0, Dec. 2017, 3rd Generation Partnership Project; Technical Specification Group Services and System Aspects; Procedures for the 5G System; Stage 2 (Release 15) (258 pages total).

3GPP TS 29.510 V15.0.0, Jun. 2018, 3rd Generation Partnership Project; Technical Specification Group Core Network and Terminals; 5G System; Network Function Repository Services; Stage 3 (Release 15) (64 pages total).

3GPP TS 23.503 V15.0.0, Dec. 2017, 3rd Generation Partnership Project; Technical Specification Group Services and System Aspects; Policy and Charging Control Framework for the 5G System; Stage 2 (Release 15) (56 pages).

Ericsson, "23.502: Network Internal Exposure in Service Based Architecture", S2-172357 (was S2-171813), SA WG2 Meeting #120, Mar. 27-31, 2017, Busan, South Korea (6 pages).

Nokia et al., "TS 23.502: Exposure—Bulk event subscription", S2-175983 (was S2-17xxxx), SA WG2 Meeting #122bis, Aug. 21-25, 2017, Sophia Antipolis, France (12 pages).

ETSI TS 123 502 V15.2.0, Jun. 2018, Technical Specification, 5G; Procedures for the 5G System (3GPP TS 23.502 version 15.2.0 Release 15) (311 pages).

* cited by examiner

METHODS, APPARATUS AND COMPUTER-READABLE MEDIUMS SUPPORTING SUBSCRIPTIONS TO EVENTS IN A CORE NETWORK

CROSS REFERENCE TO RELATED APPLICATION(S)

This application is a 35 U.S.C. § 371 National Stage of International Patent Application No. PCT/EP2018/076457, filed Sep. 28, 2018, designating the United States, which claims priority to EP application no. 18382610.6, filed Aug. 13, 2018.

TECHNICAL FIELD

Embodiments of the present disclosure relate to core networks (e.g., for wireless cellular networks), and particularly to methods, apparatus and computer-readable mediums supporting subscriptions to events in a core network.

BACKGROUND

Various 3GPP specifications describe how to handle subscriptions to receive events from one or more network functions in the core network. For example, 3GPP TS 23.502 v 15.2.0 (incorporated herein by reference), clause 4.15.3.2.4 'Exposure with bulk subscription' describes how a network exposure function (NEF) may perform bulk subscription (that is subscription of multiple terminal devices) with the network functions (NFs) that provide the necessary services.

The same specification, in clause 5.2.5.3.6 'Npcf_PolicyAuthorization_Subscribe service operation' requires that the target of policy control function (PCF) event reporting may be "an Internal Group Identifier or an indication that any UE is targeted for a specific (DNN, S-NSSAI)". This seems to indicate that the Npcf_PolicyAuthorization_Subscribe supports bulk subscription to events.

In clause 4.15.1, the specification defines the general framework for subscription to events.

There is an ongoing discussion in the 3$^{rd}$ Generation Partnership Project (3GPP) about whether the Npcf_PolicyAuthorization service or a new Npcf_EventExposure service is the most adequate service to support event exposure and bulk subscription. The support by the Npcf_PolicyAuthorization service of the generic framework for events subscription is vaguely defined in the current versions of the specification.

Regardless of which service is finally chosen, there is a lack of definition of the actual requirements for how the PCF handles subscription to events and the related notifications.

The list of events an NF can subscribe to in the PCF is described in subclause 5.2.5.3.5 of 3GPP 23.502 (v 15.2.0) "Npcf_PolicyAuthorization_Notify service operation" (e.g., signalling path status of application function (AF) session, Access Type and radio access technology (RAT) type, public land mobile network (PLMN) identifier, access network information, i.e. user location and/or user timezone information, usage report, resource allocation outcome, quality of service (QoS) targets unfulfillment). However, by itself, the list of events does not build an event exposure and bulk subscription solution.

SUMMARY

There are numerous unanswered questions that need a solution to fully define a proper bulk subscription and event exposure service in the Policy Control Function (PCF). The present disclosure provides such a bulk subscription and event exposure service in the PCF, and thus comprises solutions to the following technical problems, which can be considered separately or together.

The events defined at service data flow level for an AF session context (Charging Correlation, Failed/successful resources allocation, Out of credit, QoS Notification Control, Usage Report) are so far applied to dynamic policy charging control (PCC) rules (i.e., those generated dynamically based on the flow information provided by the AF).

Is it expected the bulk subscription to these events applies also to predefined PCC rules?

Is it expected the NEF can provide some filtering information about the predefined PCC rules to which the subscription applies?

Is it expected the bulk subscription to these events includes the notification when an event is matched for a dynamic PCC rule?

Is it expected the NEF is able to filter the subscription to only certain dynamic PCC rules?

Should the PCF notification include information about the PCC rule(s) for which the subscribed event is matched?

In a first aspect of the disclosure, to support bulk subscription to events, differentiating the applicability to predefined and/or dynamic PCC rules, it is proposed to include as Event Filter Information a new Event Parameter Type (which may be called "Subscribed Resource Types"), that will cover the possible types of rules/resources for which the subscription will apply. E.g. Predefined, Dynamic.

In a second aspect of the disclosure, to support filtering information about the services whose predefined and/or dynamic rules/resources the subscription applies to, it is proposed to include as Event Filter Information a new Event Parameter Type called "Services Information". The "Services Information" Event Parameter Type may contain one or more of:

A list of service data flow templates. A service data flow template consists of a set of service data flow filters or an application identifier referring to an application detection service; and A list of service identifiers. The service identifier is used by the PCF to determine the static or dynamic PCC rule(s) to which the bulk subscription to notification applies. Supported service identifiers are published by the PCF in the network repository function (NRF) during the registration of the event exposure service. A service identifier is a string. A PCC rule identifier can be a valid service identifier for predefined PCC rules.

In a third aspect of the disclosure, to support the notification of the resources identifiers of the rules affected when a certain event is being met (i.e. to allow the identification of the service affected by a certain matched event), it is proposed to include:

A new Event Reporting Information parameter, indicating that the report requires additional information e.g. 5) Additional Event Info required. The Additional Event Info indication, if present, contains the additional info required by a service consumer when the subscribed events are met. In the case of PCF bulk subscription to event exposure, the additional event information may be called "Related Resources Identification" and indicate whether service data flow template information, and/or service identifier are required to identify the affected resource when an event is met.

In an embodiment of the third aspect, the Notify operation may include, as Event Information, an "Additional Event Information" data structure. The "Additional Event Information" will include per reported Event ID (together with the specific information per matched event) the identifiers of the affected rules/resources in the "Related Resources Identifiers" parameter. The "Related Services Identifiers" parameter may include one or more of: a list of service data flow templates and a list of service identifiers, as requested during the subscription in the "Related Resources Identification" parameter.

A fourth aspect provides a method in a network exposure function for a core network of a wireless cellular network. The method comprises: providing, to a policy control function for the core network, a subscription request message indicating a request for a subscription for a plurality of terminal devices to receive notifications of events from the policy control function. The subscription request message comprises one or more of: an indication of one or more identifiers of events for which the plurality of terminal devices are to receive notifications; an indication of a type of resources to which the subscription relates; an indication of one or more services defined in the policy control function to which the subscription relates; and an indication as to whether notifications of events are to comprise an indication of one or more rules affected by the event.

A fifth aspect provides a method in a policy control function for a core network of a wireless cellular network. The method comprises: receiving, from a network exposure function for the core network, a subscription request message indicating a request for a subscription for a plurality of terminal devices to receive notifications of events from the policy control function. The subscription request message comprises one or more of: an indication of one or more identifiers of events for which the plurality of terminal devices are to receive notifications; an indication of a type of resources to which the subscription relates; an indication of one or more services defined in the policy control function to which the subscription relates; and an indication as to whether notifications of events are to comprise an indication of one or more rules affected by the event.

Apparatus and non-transitory computer-readable mediums are provided for performing the methods described above with respect to the first to fifth aspects of the disclosure.

Those skilled in the art will appreciate that, although the majority of this disclosure is described in the context of core networks for the 5th generation of mobile networks (5G), such as New Radio (NR), the embodiments and concepts set out herein are applicable to core networks for any wireless cellular network.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not to obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
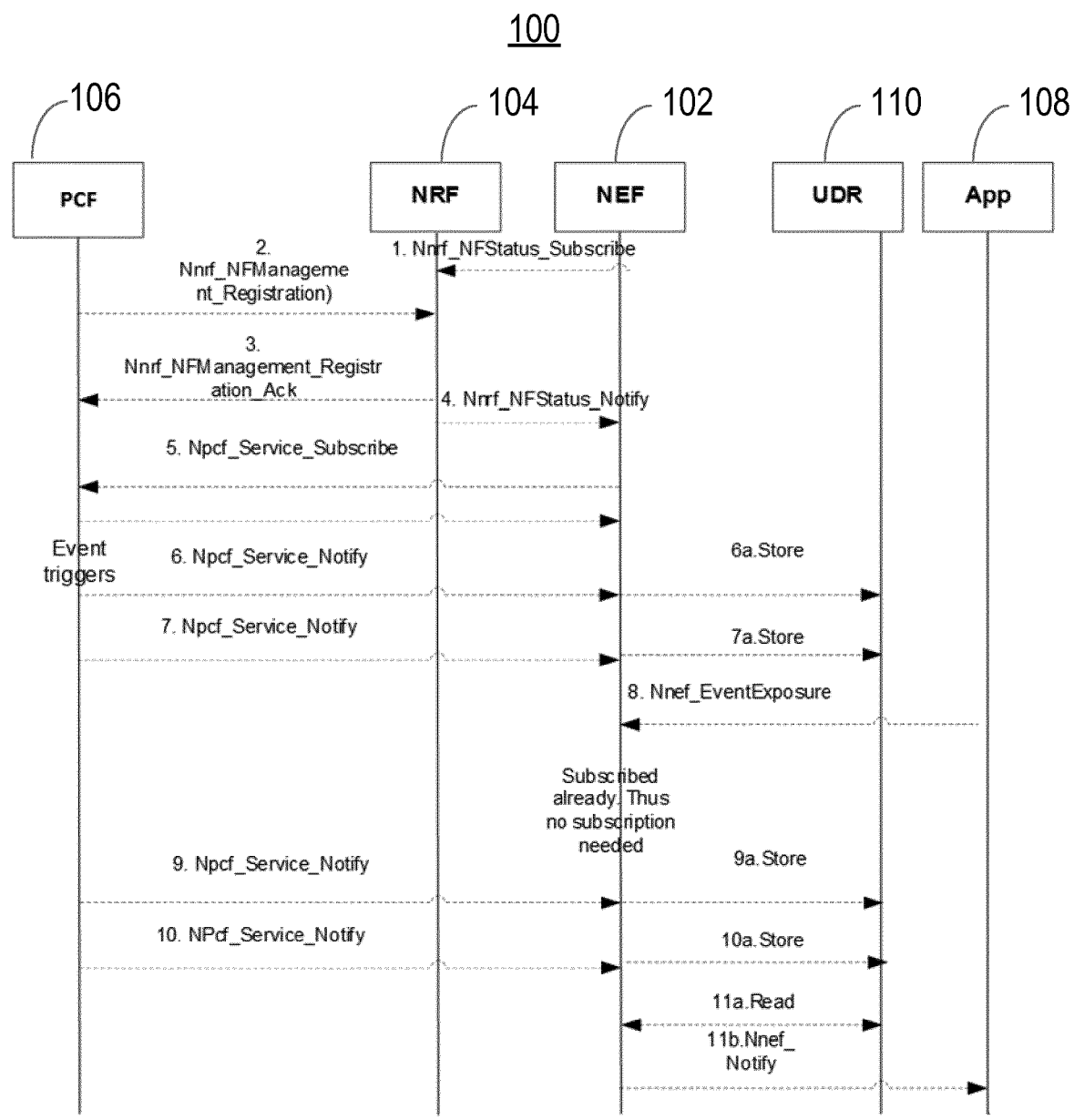
FIG. 1 is a signalling diagram in a core network of a wireless cellular system according to embodiments of the disclosure.

FIG. 1 is a signalling diagram in a core network 100 of a wireless cellular system according to embodiments of the disclosure. The core network 100 comprises a network exposure function (NEF) 102, a network repository function (NRF) 104, a policy control function (PCF) 106, and a user data repository (UDR) 110. The signalling diagram also shows an application (app) 108 which requires a subscription to receive one or more events from the PCF 106. The application 108 may be implemented in a terminal device, such as a user equipment (UE). As will be clear from the discussion below, in embodiments of the disclosure, multiple such applications and/or terminal devices may seek a subscription to receive events from the PCT 106.

Based for example on operator configuration, the NEF 102 may perform bulk subscription with the network functions (NFs) that provide necessary services (as in this case, by the PCF). This feature may be controlled by local policies of the NEF 102 that control which events (set of Event ID(s)) and UE(s) are targets of a bulk subscription.

When the NEF 102 performs bulk subscription (subscribes for any UE (i.e. all UEs), or a group of UE(s) (e.g. identifying a certain type of UEs such as Internet-of-Things UEs)), it subscribes to all the NFs that provide the necessary services. For example, in a given PLMN, NEF 102 may subscribe to all access management functions (AMFs) that support reachability notification for Internet-of-Things UEs and to all PCFs that support PCC control for certain services (e.g. PCC rules)). Upon receiving bulk subscription from the NEF 102, the NFs store this information. Whenever the corresponding event(s) occur for the requested UE(s) as in the bulk subscription request, the NFs notify the NEF 102 with the requested information.

The signalling or call flow diagram in FIG. 1 shows how PCF event exposure can happen for one UE, groups of UE(s) (e.g. identifying a certain type of UEs such as IoT UEs) or any UE (e.g., all UEs), and for the PCFs that e.g. control usage monitoring related to IoT services such as RemoteSWUpgrade, or DeviceBackgroundDataTransfer.

Further detail regarding each step of the signalling in FIG. 1 is provided below.

Step 1. NEF 102 registers with the NRF 104 for any newly registered NF along with its NF services.

PCF Registration in the NRF

Step 2. When a PCF 106 instantiates, it registers itself along with the supported PCF services with the NRF 104. When the PCF 106 supports the Npcf_Service for event exposure and bulk subscription, for example, the PCF 106 includes in the NF Profile the list of service identifiers for which the PCF supports bulk subscription, as e.g. IoT services Remote_SW_Upgrade and Device_Background_Data_Transfer.

Step 3. NRF 104 acknowledges the registration.

Step 4. NRF 104 notifies the NEF 102 (in accordance with the registration in step 1) with the newly registered NF (i.e., the PCF 106) along with the supported NF services.

NEF Bulk Subscription to PCF Events

Step 5. NEF 102 evaluates the PCF 106 and the PCF services supported against the pre-configured events within NEF. Based on the evaluation, NEF 102 subscribes with the PCF 106 either for a single UE, group of UE(s) (e.g. identifying a certain type of UEs such as IoT UEs), any UE. Thus, the NEF 102 provides or transmits a subscription request message to the PCF 106. The subscription request message may comprise one or more of:
- a list of subscribed event identifiers (e.g., Usage Monitoring Report, Service Authorization change)
- An indication as to whether the subscription applies to predefined resources, and/or dynamically allocated resources by including the parameter "Subscribed Resources Type". In one embodiment, if this parameter is omitted, the subscription applies to all types of resources (predefined and dynamic)
- An indication of the set of services to which the subscription applies, e.g., by including the parameter "Services Information". In the example of IoT services, the "Services Information" can be set, e.g. to the service identifier "Remote_SW_Updgrade" to indicate that notifications are required only when the events are met for the service Remote_SW_Upgrade.
- An indication as to whether a report or notification of a matched event shall include information of the related resources/PCC rules identifiers. In this example the "Related Resources Identification attribute is included indicating that SDF template info is required.

In one embodiment, the list of subscribed event identifiers is mandatory, while each of the other parameters is optional.

The PCF 106 may acknowledge the subscription with the NEF 102, via an acknowledgement message.

The PCF 106 thereafter monitors for events, and reports events matching the subscription to the NEF 102. FIG. 1 shows two possible implementations of this functionality: in steps 6-8; and in steps 9-11. The different implementations may be carried out according to the type of event which is to be notified, for example.

Notification of a Matched Event (I)

Steps 6-7. When the event trigger happens (e.g. a usage monitoring report), the PCF 106 notifies the requested information towards the NEF 102 along with the time stamp and with the affected PCC rules identified by their Service Data Flow template in the "Related Resources Identifiers" attribute.

The NEF 102 may store the information in the UDR 110 along with the time stamp.

Step 8. The application 108 registers with the NEF 102 for a certain event identified by event filters. If the registration for the event is authorized by the NEF 102, the NEF 102 records the association of the event and the requester identity.

Notification of a Matched Event (II)

Steps 9-10. When the event trigger happens (e.g. service authorization change), PCF 106 notifies the requested information towards NEF 102 (e.g., including service identification information). NEF 102 may store the information in the UDR 110.

Steps 11a-b. NEF 102 reads from UDR 110 and notifies the application 108 along with the time stamp for the corresponding subscribed events.

Figure 2:
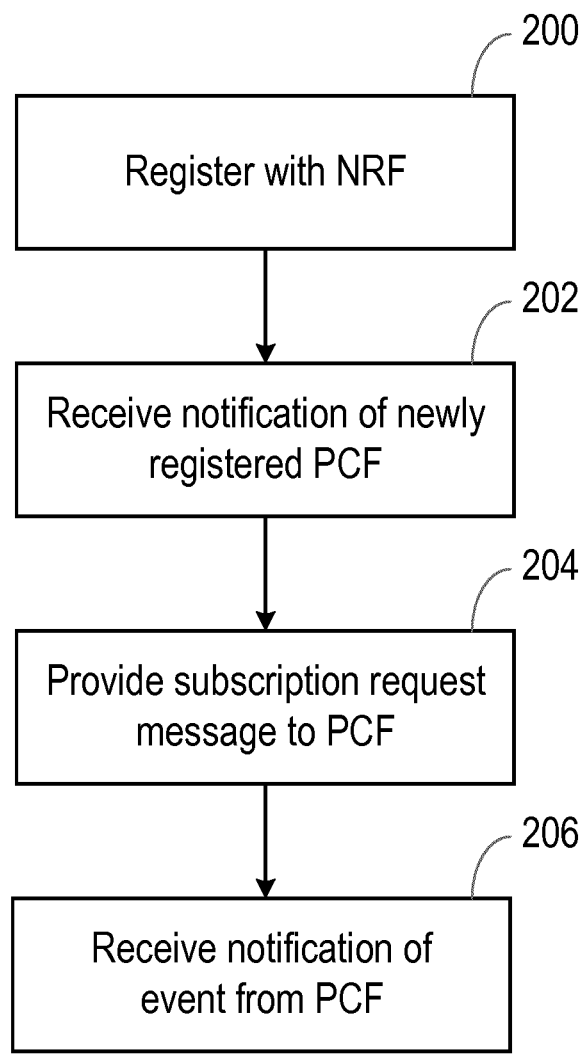
FIG. 2 is a flowchart of a method in a network exposure function according to embodiments of the disclosure.

FIG. 2 is a flowchart of a method in a network exposure function (NEF) according to embodiments of the disclosure. The method may correspond to the signalling of the NEF 102 shown above with respect to FIG. 1.

In step 200, the NEF registers with a network repository function (NRF), such as the NRF 104. This step may correspond substantially to step 1 described above with respect to FIG. 1. The registration may be to receive notification of any new network function (NF) which registers with the NRF, as well as the services provided by that NF.

In step 202, the NEF receives a notification from the NRF of a newly registered policy control function (e.g., such as the PCF 106 described above). This step may correspond substantially to step 4 described above with respect to FIG. 1. The notification additionally contains a list of the services provided by the PCF. For example, when the PCF supports the Npcf_Service for event exposure and bulk subscription, the notification may include a list of service identifiers for which the PCF supports bulk subscription, such as e.g. IoT services Remote_SW_Upgrade and Device_Background_Data_Transfer.

In step 204, the NEF provides a subscription request message to the PCF (e.g. through transmitting the subscription request message to the PCF). This step may correspond substantially to step 5 described above with respect to FIG. 1. The subscription request message indicates or comprises a request to subscribe a plurality of terminal devices or applications to receive notifications of events from the policy control function. The subscription request message comprises one or more of: an indication of one or more identifiers of events for which the plurality of terminal devices are to receive notifications; an indication of a type of resources to which the subscription relates; an indication of one or more services defined in the policy control function to which the subscription relates; and an indication as to whether notifications of events are to comprise an indication of one or more rules affected by the corresponding event.

Thus the NEF, acting as NF service consumer of the exposure service offered by the PCF, provides the list of Event Identifiers to subscribe to. In one embodiment, this list of event identifiers is mandatory.

The NEF, acting as NF service consumer, may further indicate in the subscription request message (e.g., per subscription) one of more of the following:

Whether the subscription applies to predefined resources, and/or dynamically allocated resources by including the parameter "Subscribed Resources Type". In one embodiment, if this parameter is not present, the subscription is for all types of resources (predefined and dynamic).

The set of services to which the subscription applies to by including the parameter "Services Information". If this parameter is not present, the subscription may be for all services defined in the PCF. If present, this parameter may contain a list of service data flow templates and/or a list of service identifiers.

Whether the report of the matched event shall include information of the related resources/PCC rules identifiers by including the "Related Resources Identification" attribute. If omitted, the related report may not include information about the affected rules. If included, the report shall indicate if the affected resources shall be identified with the Service Data Flow template information (if available) and/or with the service identifier.

In step 206, the NEF receives a notification of an event from the PCF. This step may correspond substantially to steps 6-7 and/or steps 9-10 described above with respect to FIG. 1. Thus the PCF detects one or more of the events to which the NEF has subscribed in step 204, and transmits one or more notification messages to the NEF.

For example, the notification message(s) may comprise a list of Event Identifiers that have been met for a given subscription. Per event met, the notification message may include additional information related to the event (e.g. PCC rule status information is included in case of failed resources allocation event).

Further, according to embodiments of the disclosure, the notification message may comprise, per subscription:

the actual service identification of the service/PCC rules that are affected by the matched event by including the "Related Resources Identifiers" parameter. The notification message may include the Service Data Flow template (if available) and/or the Service Identifier of the affected PCC rule, as requested by the "Related Resources Identification" parameter included during the subscription in step 204.

Thereafter, the NEF may expose the notified events to the relevant applications or terminal devices, e.g., by following one or more of steps 6a, 7a, 8, 9a, 10a, 11a and 11b described above with respect to FIG. 1.

Figure 3:
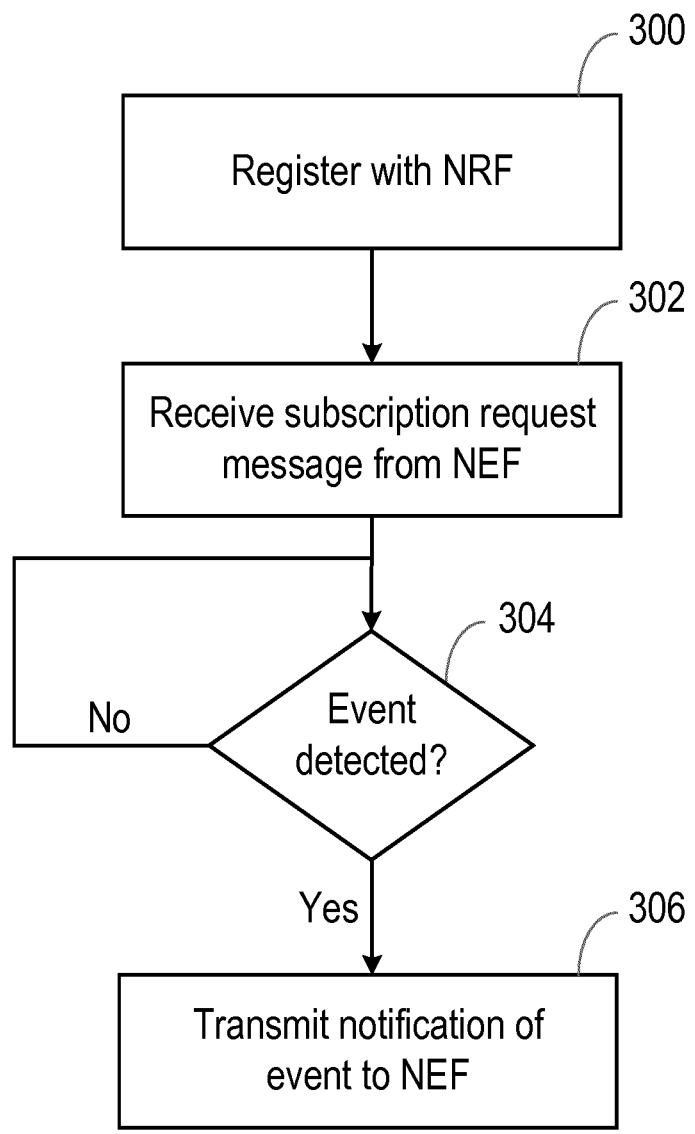
FIG. 3 is a flowchart of a method in policy control function according to embodiments of the disclosure.

FIG. 3 is a flowchart of a method in policy control function according to embodiments of the disclosure. The method may correspond to the signalling of the PCF 106 shown above with respect to FIG. 1.

In step 300, which may be performed upon the PCF instantiating, the PCF registers itself with a network repository function (NRF) of the core network, e.g., the NRF 104.

The PCF may also register its supported PCF services. This step may correspond substantially to step 2 described above with respect to FIG. 1.

According to embodiments of the disclosure, the registration in the NRF using the Nnrf_NFManagement service is modified to include (e.g., in the PCF NF Profile) a new piece of information: the set of services identifiers that can be handled by the Npcf service in charge of bulk subscription.

For example, when the PCF 106 supports the Npcf_Service for event exposure and bulk subscription, the PCF 106 includes in the NF Profile the list of service identifiers for which the PCF supports bulk subscription, as e.g. IoT services Remote_SW_Upgrade and Device_Background_Data_Transfer.

In step 302, the PCF receives a subscription request message from a NEF, e.g., the NEF 102. This step may correspond substantially to step 5 described above with respect to FIG. 1.

The subscription request message indicates or comprises a request to subscribe a plurality of terminal devices or applications to receive notifications of events from the PCF. The subscription request message comprises one or more of: an indication of one or more identifiers of events for which the plurality of terminal devices are to receive notifications; an indication of a type of resources to which the subscription relates; an indication of one or more services defined in the PCF to which the subscription relates; and an indication as to whether notifications of events are to comprise an indication of one or more rules affected by the corresponding event.

Thus the NEF, acting as NF service consumer of the exposure service offered by the PCF, provides the list of Event Identifiers to subscribe to. In one embodiment, this list of event identifiers is mandatory.

The NEF, acting as NF service consumer, may further indicate in the subscription request message (e.g., per subscription) one of more of the following:

Whether the subscription applies to predefined resources, and/or dynamically allocated resources by including the parameter "Subscribed Resources Type". In one embodiment, if this parameter is not present, the subscription is for all types of resources (predefined and dynamic).

The set of services to which the subscription applies to by including the parameter "Services Information". If this parameter is not present, the subscription may be for all services defined in the PCF. If present, this parameter may contain a list of service data flow templates and/or a list of service identifiers.

Whether the report of the matched event shall include information of the related resources/PCC rules identifiers by including the "Related Resources Identification" attribute. If omitted, the related report may not include information about the affected rules. If included, the report shall indicate if the affected resources shall be identified with the Service Data Flow template information (if available) and/or with the service identifier.

In step 304, the PCF monitors for events, particularly events of the types specified in the subscription request message. If no such events are detected, step 304 is repeated.

Upon detection of one or more events of the types specified in the subscription request message, in step 306 the PCF transmits a report or notification of the event(s) to the NEF. This step may correspond substantially to steps 6-7 and/or steps 9-10 described above with respect to FIG. 1.

For example, the notification message(s) may comprise a list of Event Identifiers that have been met for a given subscription. Per event met, the notification message may include additional information related to the event (e.g. PCC rule status information is included in case of failed resources allocation event).

Further, according to embodiments of the disclosure, the notification message may comprise, per subscription:

the actual service identification of the service/PCC rules that are affected by the matched event by including the "Related Resources Identifiers" parameter. The notification message may include the Service Data Flow template (if available) and/or the Service Identifier of the affected PCC rule, as requested by the "Related Resources Identification" parameter included during the subscription in step 204.

Figure 4:
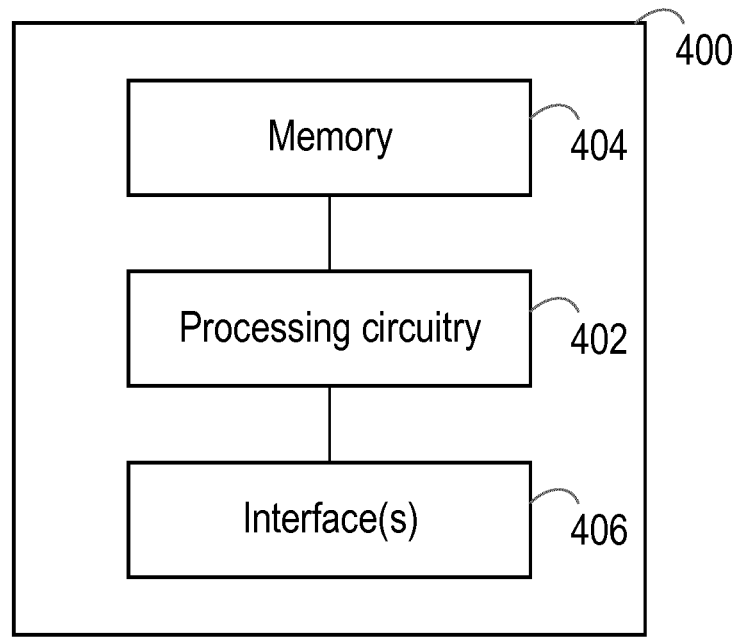
FIGS. 4 and 5 illustrate a network exposure function apparatus according to embodiments of the disclosure.

FIG. 4 is a schematic diagram of an apparatus or network node 400 according to embodiments of the disclosure. The apparatus 400 may be configured to carry out the method described above with respect to FIG. 2, for example. In one embodiment, the apparatus 400 may implement a network exposure function for a core network.

The apparatus 400 comprises processing circuitry 402 and a machine-readable medium (such as memory) 404. The machine-readable medium stores instructions which, when executed by the processing circuitry 402, cause the apparatus 400 to: provide (e.g., through transmission), to a policy control function for the core network, a subscription request message indicating a request for a subscription for a plurality of terminal devices to receive notifications of events from the policy control function. The subscription request message comprises one or more of: an indication of one or more identifiers of events for which the plurality of terminal devices are to receive notifications; an indication of a type of resources to which the subscription relates; an indication of one or more services defined in the policy control function to which the subscription relates; and an indication as to whether notifications of events are to comprise an indication of one or more rules affected by the event.

In the illustrated embodiment, the apparatus 400 also comprises one or more interfaces 406, for receiving signals from other nodes of the network and/or transmitting signals to other nodes of the network. The interfaces 406 may use any appropriate communication technology, such as electronic signalling, optical signalling or wireless (radio) signalling.

In the illustrated embodiment, the processing circuitry 402, the machine-readable medium 404 and the interfaces 406 are operatively coupled to each other in series. In other embodiments, these components may be coupled to each other in a different fashion, either directly or indirectly. For example, the components may be coupled to each other via a system bus or other communication line.

Figure 5:
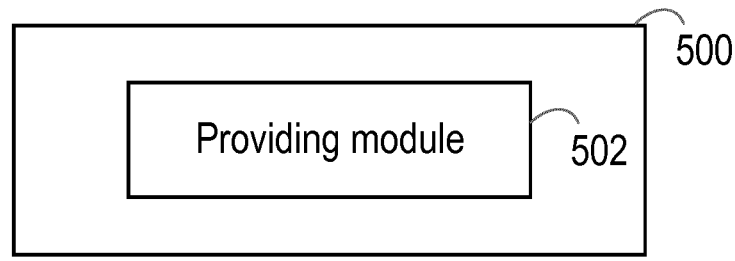

FIG. 5 is a schematic diagram of an apparatus or network node 500 according to embodiments of the disclosure. The apparatus 500 may be configured to carry out the method described above with respect to FIG. 2, for example. In one embodiment, the apparatus implements a network exposure function for a core network.

The apparatus 500 comprises a providing module 502. The providing module 502 is configured to provide (e.g., through transmission), to a policy control function for the core network, a subscription request message indicating a request for a subscription for a plurality of terminal devices to receive notifications of events from the policy control function. The subscription request message comprises one or more of: an indication of one or more identifiers of events for which the plurality of terminal devices are to receive notifications; an indication of a type of resources to which the subscription relates; an indication of one or more services defined in the policy control function to which the subscription relates; and an indication as to whether notifications of events are to comprise an indication of one or more rules affected by the event.

The apparatus 500 may also comprise one or more interface modules (not illustrated), for receiving signals from other nodes of the network and/or transmitting signals to other nodes of the network. The interfaces may use any appropriate communication technology, such as electronic signalling, optical signalling or wireless (radio) signalling.

Figure 6:
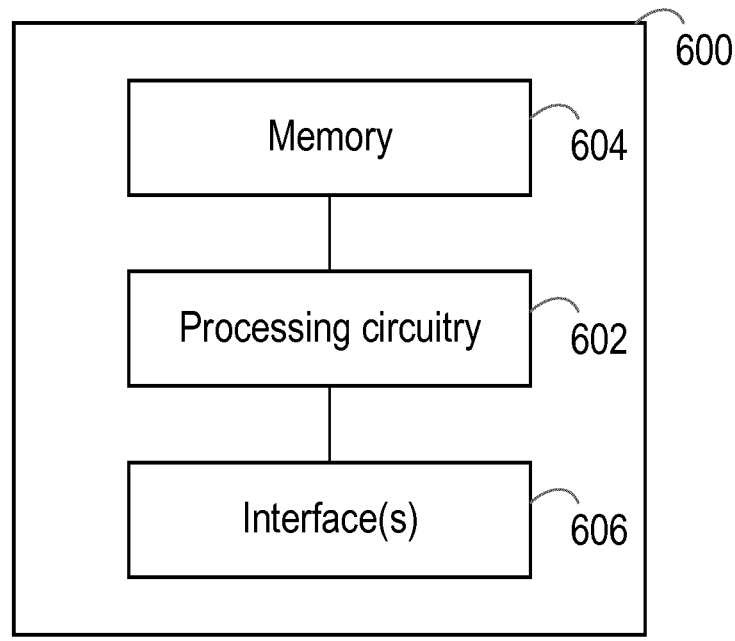
FIGS. 6 and 7 illustrate a policy control function apparatus according to embodiments of the disclosure.

FIG. 6 is a schematic diagram of an apparatus or network node 600 according to embodiments of the disclosure. The apparatus 600 may be configured to carry out the method described above with respect to FIG. 3, for example, and may implement a policy control function.

The apparatus 600 comprises processing circuitry 602 and a machine-readable medium (such as memory) 604. The machine-readable medium stores instructions which, when executed by the processing circuitry 602, cause the apparatus 600 to: receive, from a network exposure function for the core network, a subscription request message indicating a request for a subscription for a plurality of terminal devices to receive notifications of events from the policy control function. The subscription request message comprises one or more of: an indication of one or more identifiers of events for which the plurality of terminal devices are to receive notifications; an indication of a type of resources to which the subscription relates; an indication of one or more services defined in the policy control function to which the subscription relates; and an indication as to whether notifications of events are to comprise an indication of one or more rules affected by the event.

In the illustrated embodiment, the apparatus 600 also comprises one or more interfaces 606, for receiving signals from other nodes of the network and/or transmitting signals to other nodes of the network. The interfaces 606 may use any appropriate communication technology, such as electronic signalling, optical signalling or wireless (radio) signalling.

In the illustrated embodiment, the processing circuitry 602, the machine-readable medium 604 and the interfaces 606 are operatively coupled to each other in series. In other embodiments, these components may be coupled to each other in a different fashion, either directly or indirectly. For example, the components may be coupled to each other via a system bus or other communication line.

Figure 7:
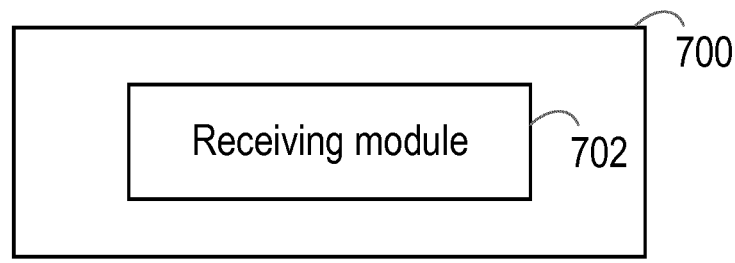

FIG. 7 is a schematic diagram of an apparatus or network node 700 according to embodiments of the disclosure. The apparatus 700 may be configured to carry out the method described above with respect to FIG. 3, for example, and may implement a policy control function.

The apparatus 700 comprises a receiving module 702. The receiving module 702 is configured to receive, from a network exposure function for the core network, a subscription request message indicating a request for a subscription for a plurality of terminal devices to receive notifications of events from the policy control function. The subscription request message comprises one or more of: an indication of one or more identifiers of events for which the plurality of terminal devices are to receive notifications; an indication of a type of resources to which the subscription relates; an indication of one or more services defined in the policy control function to which the subscription relates; and an indication as to whether notifications of events are to comprise an indication of one or more rules affected by the event.

The apparatus 700 may also comprise one or more interface modules (not illustrated), for receiving signals from other nodes of the network and/or transmitting signals to other nodes of the network. The interfaces may use any appropriate communication technology, such as electronic signalling, optical signalling or wireless (radio) signalling.

The modules described above with respect to FIGS. 5 and 7 may comprise any combination of hardware and/or software. For example, in one embodiment, the modules are implemented entirely in hardware. As noted above, hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions. In another embodiment, the modules may be implemented entirely in software. In yet further embodiments, the modules may be implemented in combinations of hardware and software.

The present disclosure therefore provides methods, apparatus and machine-readable mediums for supporting bulk subscriptions in a PCF for a core network.

It should be noted that the above-mentioned embodiments illustrate rather than limit the concepts disclosed herein, and that those skilled in the art will be able to design many alternative embodiments without departing from the scope of the appended following claims. The word "comprising" does not exclude the presence of elements or steps other than those listed in a statement, "a" or "an" does not exclude a plurality, and a single processor or other unit may fulfil the functions of several units recited in the statements. Any reference signs in the claims shall not be construed so as to limit their scope.

The invention claimed is:

1. A method in a network exposure function (NEF) for a core network of a wireless cellular network, the method comprising:
   the NEF providing, to a policy control function (PCF) for the core network, a subscription request message to subscribe to event reporting, wherein
   the subscription request message comprises 1) targeting information indicating a target of the event reporting, wherein the targeting information comprises i) an indicator indicating that any user equipment (UE) is targeted for a specific Data Network Name (DNN) and network slice or ii) a UE group identifier identifying group of UEs and 2) a first indication indicating one or more types of resources for which the subscription will apply, and the first indication included in the subscript request message indicates that the subscription applies to dynamically allocated resources.

2. The method of claim 1, wherein
the subscription request message further comprises one or more of:
a second indication that comprises one or more of a list of service identifiers or a list of service data flow templates, or
a third indication that comprises an indication as to whether notifications of events are to comprise one or more of: one or more service identifiers affected by the event; or one or more service data flow templates affected by the event.

3. The method of claim 1, further comprising:
the NEF receiving, from the PCF, a notification of an event, the notification comprising an indication of one or more rules affected by the event.

4. A non-transitory computer-readable medium storing instructions which, when executed by processing circuitry of a network exposure function apparatus for a core network, causes the network exposure function apparatus to perform the method of claim 1.

5. A non-transitory computer-readable medium storing instructions which, when executed by processing circuitry of a policy control function apparatus for a core network, causes the policy control function apparatus to perform the method of claim 1.

6. A method in a policy control function (PCF) for a core network of a wireless cellular network, the method comprising:
   the PCF receiving, from a network exposure function (NEF), a subscription request message to subscribe to event reporting, wherein
   the subscription request message comprises 1) targeting information indicating a target of the event reporting, wherein the targeting information comprises i) an indicator indicating that any user equipment (UE) is targeted for a specific Data Network Name and network slice or ii) a UE group identifier identifying group of UEs and 2) a first indication indicating one or more types of resources for which the subscription will apply, and the first indication included in the subscript request message indicates that the subscription applies to dynamically allocated resources.

7. The method of claim 6, wherein
the subscription request message further comprises one or more of:
a second indication that comprises one or more of a list of service identifiers and a list of service data flow templates, or
a third indication that comprises an indication as to whether notifications of events are to comprise one or more of: one or more service identifiers affected by the event; or one or more service data flow templates affected by the event.

8. The method of claim 6, further comprising:
responsive to detection of an event to which the NEF has subscribed, transmitting, to the NEF, a notification of the event.

9. A network exposure function apparatus for a core network of a wireless cellular network, the network exposure function apparatus comprising processing circuitry and a non-transitory computer-readable medium storing instructions which, when executed by the processing circuitry, cause the network exposure function apparatus to:
   provide, to a policy control function for the core network, a subscription request message to subscribe to event reporting, wherein
   the subscription request message comprises 1) targeting information indicating a target of the event reporting, wherein the targeting information comprises i) an indicator indicating that any user equipment (UE) is targeted for a specific Data Network Name and network slice or ii) a UE group identifier identifying group of UEs and 2) a first indication indicating one or more types of resources for which the subscription will apply, and the first indication included in the subscript request message indicates that the subscription applies to dynamically allocated resources.

10. The apparatus of claim 9, wherein
the subscription request message further comprises one or more of:
a second indication that comprises a first parameter within the subscription request message, and wherein an absence of the first parameter in the subscription request message conveys an indication that the subscription relates to both pre-defined resources and dynamically allocated resources, and
a third indication that comprises an indication as to whether notifications of events are to comprise one or more of: one or more service identifiers affected by the event; or one or more service data flow templates affected by the event.

11. The apparatus of claim 10, wherein the second indication comprises one or more of a list of service identifiers and a list of service data flow templates.

12. The apparatus of claim 11, wherein each service identifier enables the policy control function to determine one or more policy and charging control rules to which the subscription relates.

13. The apparatus of claim 11, wherein each service data flow template comprises one or more of: a set of one or more service data flow filters; and an application identifier referring to an application detection service.

14. The apparatus of claim 11, wherein the second indication comprises a second parameter within the subscription request message, and wherein an absence of the second parameter in the subscription request message conveys an indication that the subscription relates to all services defined in the policy control function.

15. The apparatus of claim 9, wherein the apparatus is further caused to:
receive, from the policy control function, a notification of an event to which the plurality of terminal devices are subscribed, the notification comprising an indication of one or more rules affected by the event.

16. A policy control function apparatus for a core network of a wireless cellular network, the policy control function apparatus comprising processing circuitry and a non-transitory computer-readable medium storing instructions which, when executed by the processing circuitry, cause the policy control function apparatus to:
receive, from a network exposure function for the core network, a subscription request message to subscribe to event reporting, wherein
the subscription request message comprises 1) targeting information indicating a target of the event reporting, wherein the targeting information comprises i) an indicator indicating that any user equipment (UE) is targeted for a specific Data Network Name and network slice or ii) a UE group identifier identifying group of UEs and 2) a first indication indicating one or more types of resources for which the subscription will apply, and the first indication included in the subscript request message indicates that the subscription applies to dynamically allocated resources.

17. The apparatus of claim 16, wherein
the subscription request message further comprises one or more of:
a second indication that comprises one or more of a list of service identifiers and a list of service data flow templates, or
a third indication that comprises an indication as to whether notifications of events are to comprise one or more of: one or more service identifiers affected by the event; or one or more service data flow templates affected by the event.

18. The apparatus of claim 17, wherein the second indication comprises one or more of a list of service identifiers and a list of service data flow templates.

19. The apparatus according to claim 18, wherein each service identifier enables the policy control function to determine one or more policy charging rules to which the subscription relates.

20. The apparatus of claim 18, wherein each service data flow template comprises one or more of: a set of one or more service data flow filters; and an application identifier referring to an application detection service.

21. The apparatus of claim 18, wherein the second indication comprises a second parameter within the subscription request message, and wherein an absence of the second parameter in the subscription request message conveys an indication that the subscription relates to all services defined in the policy control function.

22. The apparatus of claim 16, wherein the apparatus is further caused to: responsive to detection of an event to which the plurality of terminal devices are subscribed, transmit, to the network exposure function, a notification of an event to which the plurality of terminal devices are subscribed.

23. The apparatus of claim 22, wherein the notification comprises an indication of one or more rules affected by the event.

\* \* \* \* \*